(12) United States Patent
Colban

(10) Patent No.: US 6,859,465 B1
(45) Date of Patent: Feb. 22, 2005

(54) METHOD AND APPARATUS FOR CONSTANT THROUGHPUT RATE ADAPTATION

(75) Inventor: Erik A. Colban, Oslo (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 705 days.

(21) Appl. No.: 09/665,057

(22) Filed: Sep. 19, 2000

Related U.S. Application Data

(60) Provisional application No. 60/166,753, filed on Nov. 22, 1999.

(51) Int. Cl.[7] .................................................. H04J 3/07
(52) U.S. Cl. ....................................................... 370/506
(58) Field of Search ................................ 370/469, 503, 370/505, 506, 522, 527, 516

(56) References Cited

U.S. PATENT DOCUMENTS

| | | | | |
|---|---|---|---|---|
| 5,541,919 A | * | 7/1996 | Yong et al. .................. | 370/416 |
| 5,610,917 A | * | 3/1997 | Diachina ..................... | 370/469 |
| 5,835,602 A | | 11/1998 | Lang | |
| 5,894,517 A | * | 4/1999 | Hutchison et al. .......... | 713/189 |
| 6,219,358 B1 | * | 4/2001 | Pinder et al. ............... | 370/537 |
| 6,442,178 B1 | * | 8/2002 | Arato et al. ................ | 370/506 |

FOREIGN PATENT DOCUMENTS

| | | |
|---|---|---|
| DE | 3907737 | 9/1990 |
| EP | 0582537 | 2/1994 |
| JP | 59017749 | 5/1984 |
| JP | 01071345 | 6/1989 |
| JP | 09036852 | 2/1997 |

OTHER PUBLICATIONS

GSM 08.20 V8.1.0 (Nov. 1999).
International Telecommunication Union V.110 (10/96).

* cited by examiner

*Primary Examiner*—Chau Nguyen
*Assistant Examiner*—Andrew Wahba

(57) ABSTRACT

A method and apparatus is described for providing rate adaptation between a first node and a second node in a data communication environment employing bit stuffing and having a link budget of B bits per second. One or more N-sized frames of user data are randomized at the first node according to a predetermined random sequence to produce randomized N-sized frames which are then de-randomized at the second node according to the random sequence. N is the size of the N-sized frames in bits. Occurrences of a flag sequence related event is detected for in the N-sized frames after randomizing, and up to n bits are inserted in the N-sized frames according to a bit stuffing protocol. By performing randomizing before inserting, n and N are selected such that n+N does not exceed B. The bits are then removed such that de-randomizing can be performed. Randomizing includes combining N-sized frames with a random sequence and de-randomizing includes uncombining the N-sized frames with the random sequence. Alternatively, one or more random sequences may be used in randomizing and de-randomizing. Inserting up to n bits further includes determining a distribution of stuffing bits n according to h(n,N) for the N-sized frames such that n and N are selected so that n+N does not exceed B.

4 Claims, 9 Drawing Sheets

METHOD AND APPARATUS FOR CONSTANT THROUGHPUT RATE ADAPTATION

CROSS-REFERENCE TO RELATED APPLICATIONS

The present application claims priority from U.S. Provisional Application No. 60/166,753, filed Nov. 22, 1999, the contents of which are incorporated herein by reference.

BACKGROUND

The present invention is related to pulse or digital communications. In particular, the present invention is related to rate synchronization or adaptation associated with data transmission in private or public networks using bit insertion or stuffing.

In modern date communications, when data are transmitted through a data channel or "bit pipe", data are typically structured into frames. Framing serves not only to separate data from control information or channel overhead, but allows one user data rate to be adapted, for example, to a higher data rate or bit rate provided by an underlying protocol layer associated with, for example, the data channel or bit pipe. In accordance with typical framing schemes, frame start positions must be identified for synchronization purposes and to allow receivers access to known positions within the frame where payload data is located. In order to identify frame boundaries, frames must either have a uniquely identifiable frame header or frame separator typically embodied in, for example, a unique bit pattern. However, due to the random nature of data contained in, for example, the payload portion of the frame, random occurrences of the frame start identifier bit pattern are possible. To assure uniqueness, the bit pattern associated with the frame start identifier must not be allowed to occur within the data associated with the remainder of the frame contents. Thus, to ensure, for example, data transparency and to ensure proper frame synchronization, random occurrences of the frame start identifier bit pattern must be removed from the data payload portion and any non-frame identifier portion of the frame contents.

As a practical example, it will be appreciated by those skilled in the art that in accordance with, for example, ITU-T V.110, the start of a frame is identified by a zero octet which consists of 8 consecutive zero bits. In such a scheme, data transparency is ensured by ensuring that each following octet in the V.110 frame starts with a 1 bit. Data transparency overhead in such a scheme is referred to as 1/7, meaning one extra bit for every seventh data bit.

In accordance with other schemes, flag stuffing may be used to achieve data transparency. One common scheme within the HDLC protocol is often referred to as X.31 flag stuffing. In accordance with X.31 flag stuffing, HDLC frames are separated by flags consisting of the following eight bits: 01111110. It can be seen that the flag therefore consists of a zero bit followed by six 1 bits. When flag stuffing is applied on a synchronous bit stream, data transparency is ensured by bit stuffing, which consists of inserting an extra 0 bit after each sequence of five consecutive 1 bits of data at the sender and removing each 0 bit occurring after five consecutive 1 bits of data at the receiver. Otherwise, random occurrences of six consecutive 1 bits of data would be confused by a receiver as a flag signaling the beginning of a new frame. Thus, the worst case data transparency overhead in such a scheme is 1/5, e.g. one extra 0 bit inserted for every fifth bit. It should be noted however that the worst case scenario occurs only when a frame contains a data payload consisting entirely of 1 bits and that, on average, the data transparency overhead is much less.

A typical flag stuffing rate adaptation scheme 100 is illustrated in FIG. 1. At sender 110, flags may be inserted in flag stuffing block 113 between frame in 111 and subsequent frame in 111, after ensuring, in bit stuffing block 112, that there are no accidental occurrences of flags within frame data. In FIG. 2, a typical bit stuffing scheme 200 is illustrated. As can be seen, a zero bit may be added after each sequence of five ones in the frame. Frame 210 may represent raw frame data being processed, for example, by a sender such as sender 110. Data segment 211 contains five consecutive 1 bits, therefore in processed frame 220, zero bit 221 appears after data segment 211. It should be noted that to reduce processing overhead, frame 210 is preferably processed bitwise. Accordingly, it is not known by, for example, a bit stuffing block such as bit stuffing block 112, whether the next bit will be a one or a zero. Since data segment 211 only contains five consecutive ones, it would not be interpreted as a flag. In accordance with typical bit stuffing protocols, however, zero bit 221 will be inserted anyway. Data segment 212 contains six consecutive 1 bits and could be interpreted as a flag by a receiver. Thus, zero bit 222 is inserted after the fifth consecutive 1 bit of data segment 212 as shown. By bit stuffing in the above described manner, it is virtually guaranteed that a flag will not appear in processed frame 220.

Problems arise however, in that schemes for identifying embedded frame start identifier bit patters and ensuring data transparency add overhead. It is a competing desire in the art to reduce overhead as much as possible in order to maximize utilization of available bandwidth. Accordingly, in still other bit stuffing schemes such as that provided for in GSM TS 08.20, A-TRAU overhead may be reduced since frames are defined with a data transparency scheme having an overhead of 1/36. It should be noted that the scheme is fairly complicated, and interested readers are referred to TS 08.20 for further details. In other cases it may further be possible to perform flag stuffing in conjunction with V.110, A-TRAU.

U.S. Pat. No. 5,835,602 to Lang describes an approach wherein packet based mappings may be scrambled before insertion into, for example, a payload envelope. The purpose of such a scheme includes avoiding the possibility of generating arbitrarily long run lengths of a transmitted sequence thus disrupting a system. Lang does not disclose schemes associated with rate adaptation and cannot reduce and predict more accurately rate adaptation overhead and thus assure high levels of transmission efficiency. Moreover, Lang describes scrambling flag sequences which would be antithetical to rate adaptation schemes. Differences between Lang and rate adaptation schemes may be better appreciated as Lang describes how scrambling is used to aid clock recovery Problems arise however with known rate adaptation solutions. For example, the V.110 rate adaptation protocol is designed only for certain specific rates. Although the V.110 principle, namely to use a zero octet to identify the start of a frame and let each subsequent octet begin with a 1, may be used in a more general manner it may not be easy to apply. For example, V.110 also uses TDMA frames associated with, for example, ISDN compliant networks to adapt to rates up to 56 kbit/s to 64 kbit/s, but this special case is difficult to generalize. It should further be noted that V.110 has a fairly high overhead. A-TRAU is also designed for specific rates, and while its principles may also be applied generally, and overhead is fairly low, e.g. 17 bits at frame start, and one bit in 36 bits for data transparency, the A-TRAU rate adaptation scheme is rather complicated and requires more processing than V.110 and flag stuffing. It should be noted that, while overhead is constant for V.110 and A-TRAU, overhead becomes variable in the case of flag stuffing since the number of bits needed depends of frame contents. The implication of content dependent, variable overhead implies that throughput may also be variable. Accordingly, flag stuffing is used typically in combination with flow control at a higher protocol layer. In order to avoid flow control, it becomes necessary to budget sufficient bandwidth on the underlying layer such that the maximum resulting bit rate including frames, stuffed bits and flags never exceeds the budgeted bandwidth.

FIG. 3 illustrates communication scenario 300 wherein different transfer technologies may be used on two adjoining links 301 and 302. Asynchronous transfer mode (ATM) may be used on link 301 between Node A 310 and Node B 320, and a 64 kbit/s synchronous link 302 may be used between Node B 320 and Node C 330. Frames 311 sent from Node A 310 to Node B 320 may be relayed to Node C 330 using flags and stuffing bits 321 between Node B 320 and Node C 330. It should be noted that there is preferably no flow control between Node A 310 and Node B 320, hence the bit rate between Node A 310 and Node B 320 must preferably be limited sufficiently so that when flags and stuffing bits 321 are added, the resulting bit rate will never exceed 64 kbit/s. Otherwise, frames 311 will be dropped at Node B 320.

It should further be noted that data transparency overhead, e.g., the number of bits that need to be stuffed in the frames, is dependent on higher layer TI protocol 303 and the nature of user data that are transmitted thereover. Often, higher layer protocol 303 may use fixed sized Packet Data Units (PDU). In situations where there are not sufficient data to completely fill a fixed size PDU, 1 bits may be inserted as fill. Problems arise however, in that filling incomplete PDUs with 1 bits may create long sequences of ones in frames 311 and a correspondingly large number of stuffed zeroes due to bit stuffing. Also, the nature of the user data may be such that a large number of zeroes may further need to be stuffed on the basis of the user data. Budgeting for the worst case would include a data transparency overhead equal to 1/5. In such a situation, alternate protocols, such as, for example, V.110, are better suited. Consider an example where the data rate is 57.6 kbit/s and data are structured into frames 576 bits long and transmitted every 10 ms. In a worst case scenario using fixed size PDUs, 115 bits of overhead would be needed to ensure data transparency. In addition, at least one flag needs to be transmitted between every frame. In order to guarantee a constant throughput of 57.6 kbit/s, the data channel or bit pipe must allow 576+115+8 bits to be transmitted in 10 ms yielding a bit rate of 69.9 kbit/s. In such a scenario, 64 kbit/s link 302 will not suffice for guaranteeing a throughput of 57.6 kbit/s if flag stuffing is used. An alternate protocol should preferably be used. It should be noted however, that although V.110 would not be applicable to such a case, A-TRAU protocol would be better suited for such an application.

Thus a method and apparatus for allowing rate adaptation to be performed while not exceeding available bandwidth would be appreciated in the art.

SUMMARY

To fulfill these and other needs of the art, a method and apparatus is described for providing rate adaptation between a first node and a second node in a data communication environment.

Thus in accordance with various exemplary embodiments of the present invention, bit stuffing may be employed in the data communication environment and further a link budget of B of bits per second may be established over a link connecting at least the first and second nodes. One or more N-sized frames of user data may be randomized at the first node according to a predetermined random sequence to produce one or more randomized N-sized frames of user data. The randomized N-sized frames of user data may then be de-randomized at the second node according to the predetermined random sequence. It should be noted that N may represent the size of the one or more N-sized frames in bits.

In further accordance with various exemplary embodiments of the present invention, one or more occurrences of a flag sequence related event may be detected in the one or more N-sized frames of user data after the step of randomizing. An example of a flag sequence related event includes the appearance, for example, of five consecutive one bits in the N-sized frame of user data. Other examples of flag sequence related events are described in greater detail herein below. Accordingly, for each occurrence of the flag sequence related event detected, up to n bits may be inserted in corresponding N-sized frames of user data according to a bit stuffing protocol such that by performing the step of randomizing before the step of inserting, n and N are selected such that n+N does not exceed B. Detecting and insertion may be performed in the first node or in another intermediate node provided detecting and insertion are performed after randomizing. It should be understood that at this point, e.g. after randomizing, flag sequence related event detection, and bit insertion, the N-sized frames may be transmitted on a communications link. Thereafter, the up to n bits may be removed, for example, at a receiver of the N-sized frames, such that the step of de-randomizing can be performed.

In further accordance with various exemplary embodiments of the present invention, randomizing may further include combining one or more of the N-sized frames of user data with a random sequence and de-randomizing may further include uncombining the one or more N-sized frames of user data with the same random sequence. Alternately, randomizing may further include combining the one or more N-sized frames of user data with one or more random sequences and wherein the step of de-randomizing further includes correspondingly uncombining the one or more N-sized frames of user data with the one or more random sequences.

In further accordance with various exemplary embodiments of the present invention, up to n bits may be inserted as previously described and as will be described in greater detail herein after in accordance with determining a distribution of stuffing bits n according to a probability distribution function h(n,N) for the one or more randomized N-sized frames such that n and N are selected so that n+N does not exceed B. constant throughput rate adaptation using flag stuffing.

BRIEF DESCRIPTION OF THE DRAWINGS

The objects and advantages of the invention will be understood by reading the following detailed description in conjunction with the drawings, in which.

DETAILED DESCRIPTION

Figure 1:
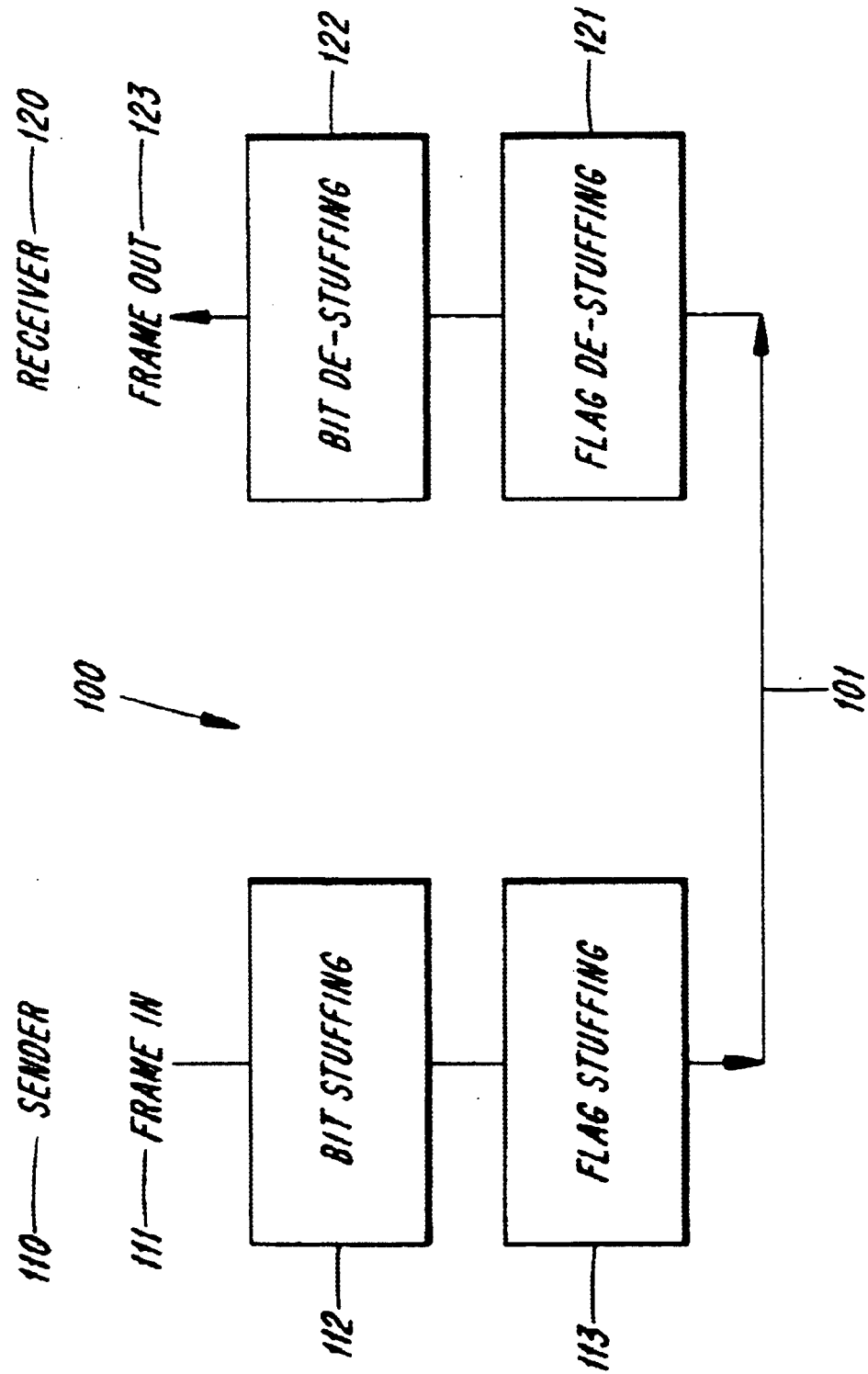
FIG. 1 is a diagram illustrating exemplary prior art bit stuffing between an exemplary sender and an exemplary receiver.
Figure 2:
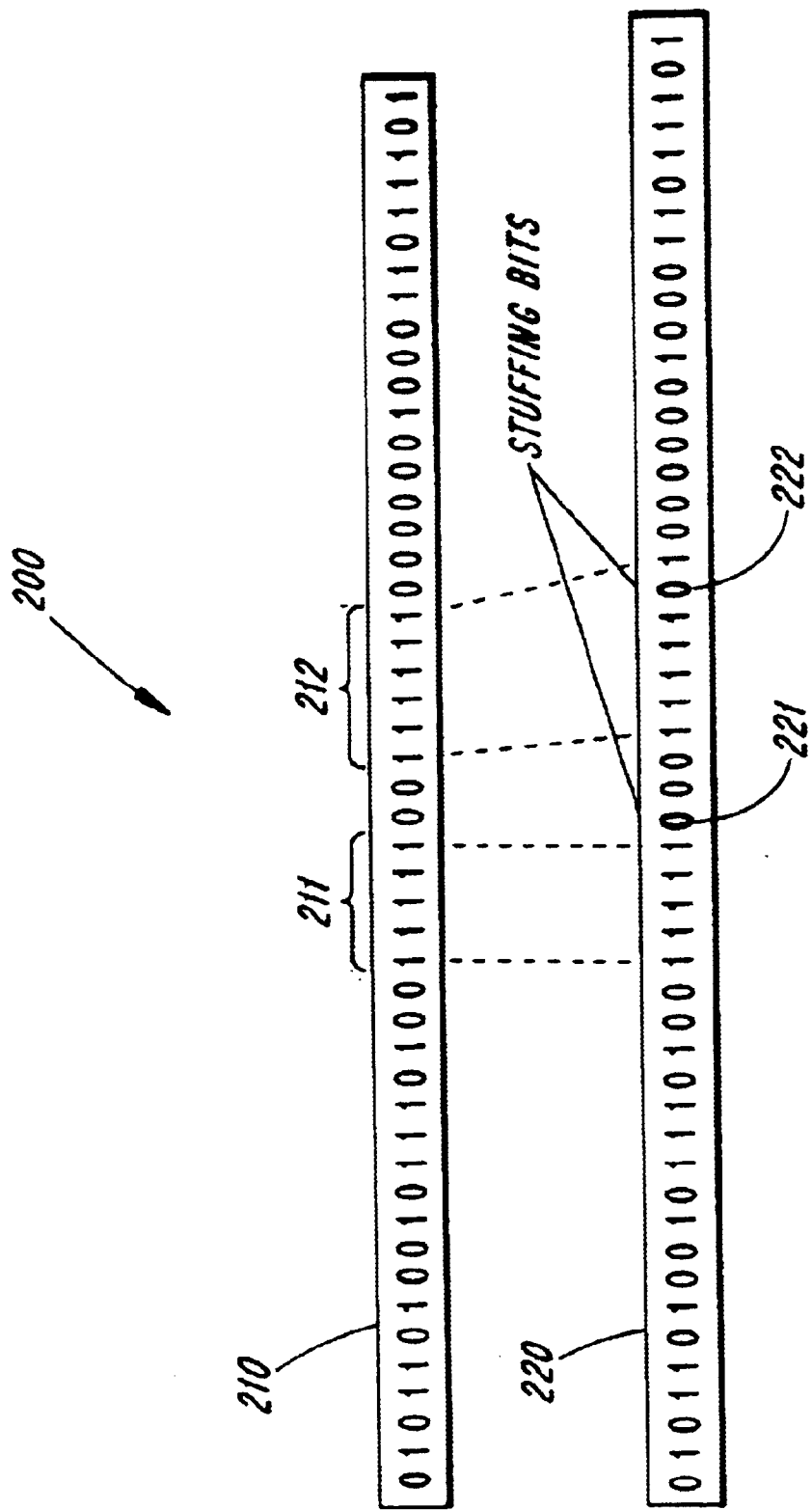
FIG. 2 is a diagram further illustrating exemplary prior art bit stuffing.

The various features of the invention will now be described with reference to the figures, in which like parts are identified with the same reference characters. Thus a method and apparatus are described for providing constant throughput rate adaptation.

Figure 4A:
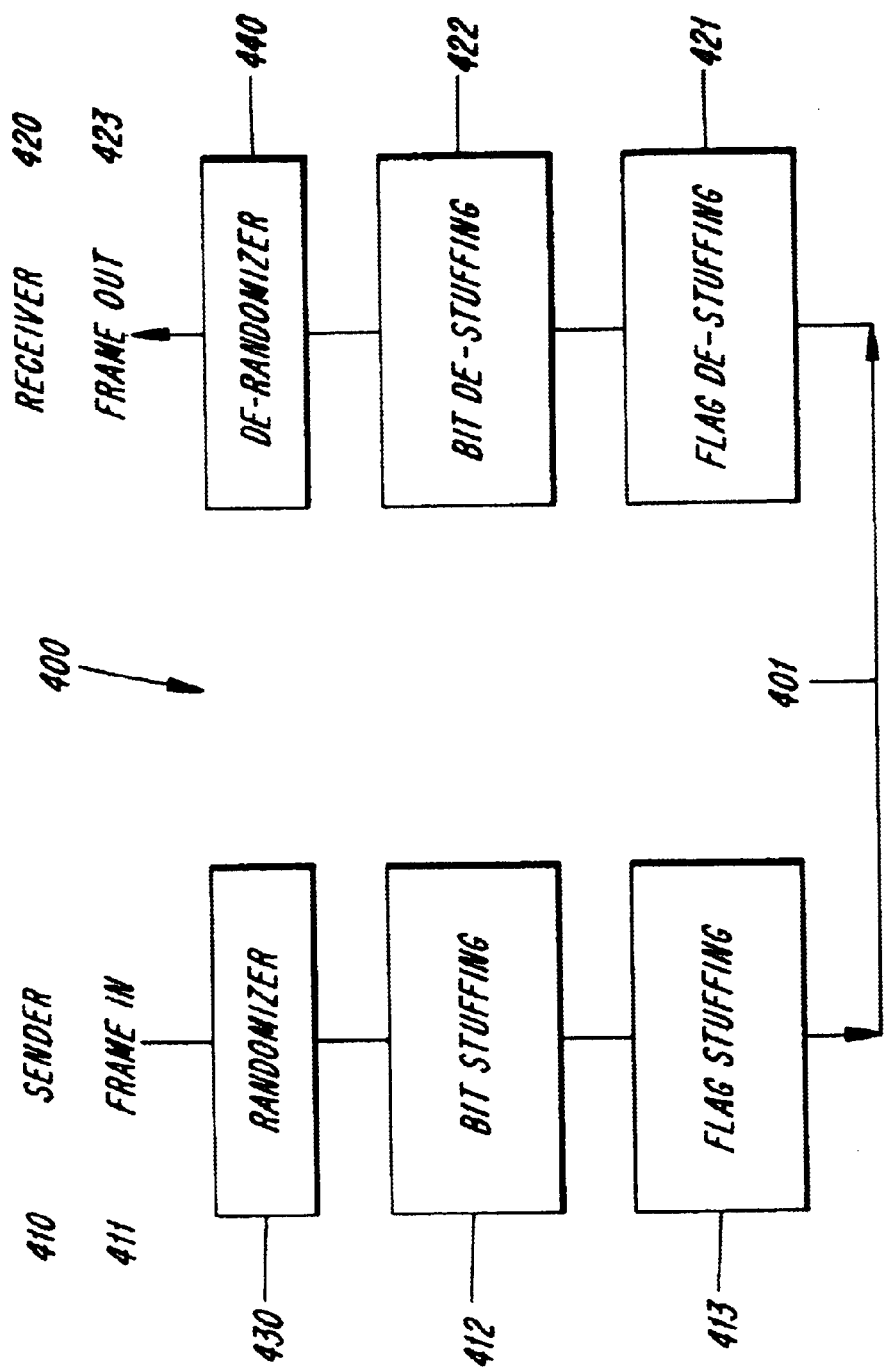
FIG. 4A is a diagram illustrating exemplary bit stuffing and flag stuffing in accordance with exemplary embodiments of the present invention.

In accordance with various exemplary embodiments of the present invention, a rate adaptation scheme may be provided based on flag stuffing which increases the throughput on a synchronous link. As can be seen in FIG. 4, an exemplary rate adaptation configuration 400 is shown for adapting data rates between, for example, sender 410 and receiver 420 over link 401. Rate adaptation configuration 400 includes modified flag stuffing in which the frame in 411 contents are preferably randomized in randomizer 430 at sender 410 before applying bit stuffing 412 and flag stuffing 413. At receiver 420, frame in 411 contents may be de-randomized in de-randomizer 440 in order to retrieve the original contents of frame in 411 as frame out 423. It should be noted that by randomizing the contents of frame in 411, for example, using randomizer 430 rate adaptation overhead levels are allowed to be predicted more accurately and preferably reduced if possible, thus reducing the overall budget associated with rate adaptation.

Figure 5:
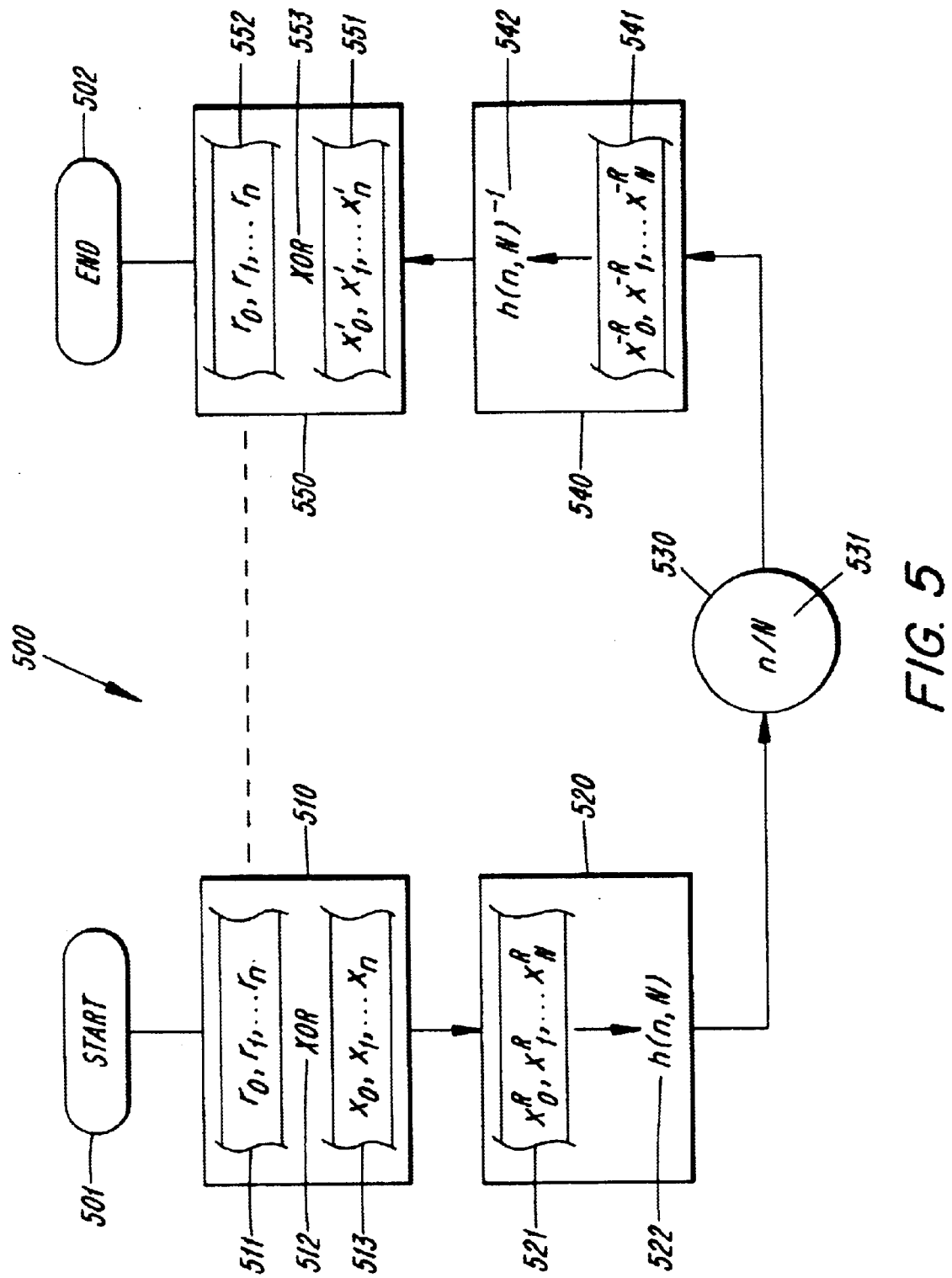
FIG. 5 is a modified flow chart illustrating exemplary blocks of an exemplary bit stuffing and flag stuffing process in accordance with exemplary embodiments of the present invention.

In order to provide randomizing of the contents of frame in 411 using randomizer 430, exemplary randomization process 500, as illustrated in FIG. 5 may be used. After start at 501, it is preferable to XOR frame contents with a random sequence which is preferably pre-arranged between, for example, sender 410 and receiver 420. According to known statistical principles, if the frame contents are statistically independent from the random sequence which is preferably defined by a suitable random process, the result of XOR operation 502 will also be random. It should be noted that frame contents and the random sequence should normally be statistically independent unless purposely made dependent to exclude any statistical anomalies that result from, for example, highly repetitive data patterns, or the like. While the same finite size random sequence may be reused for all frames, a pre-arranged random or pseudo-random sequence generator can be used where a series of randomly generated sequences, which sequences can be recreated at the receiver, may be applied to incoming frame data and XORed according to XOR operation 502 or like randomizing operation as would be known in the art.

Figure 3:
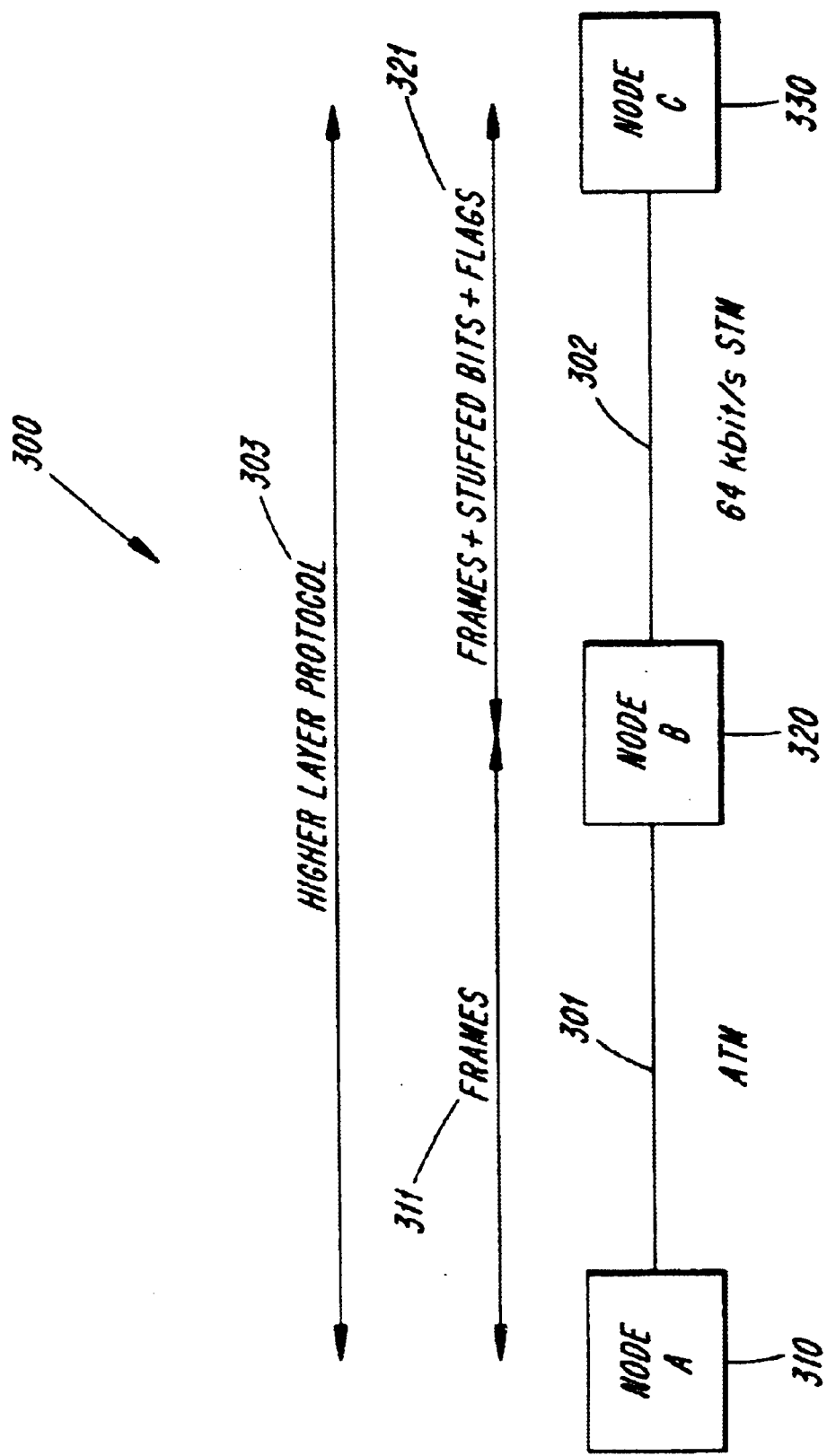
FIG. 3 is a diagram illustrating an exemplary rate adaptation environment.
Figure 4B:
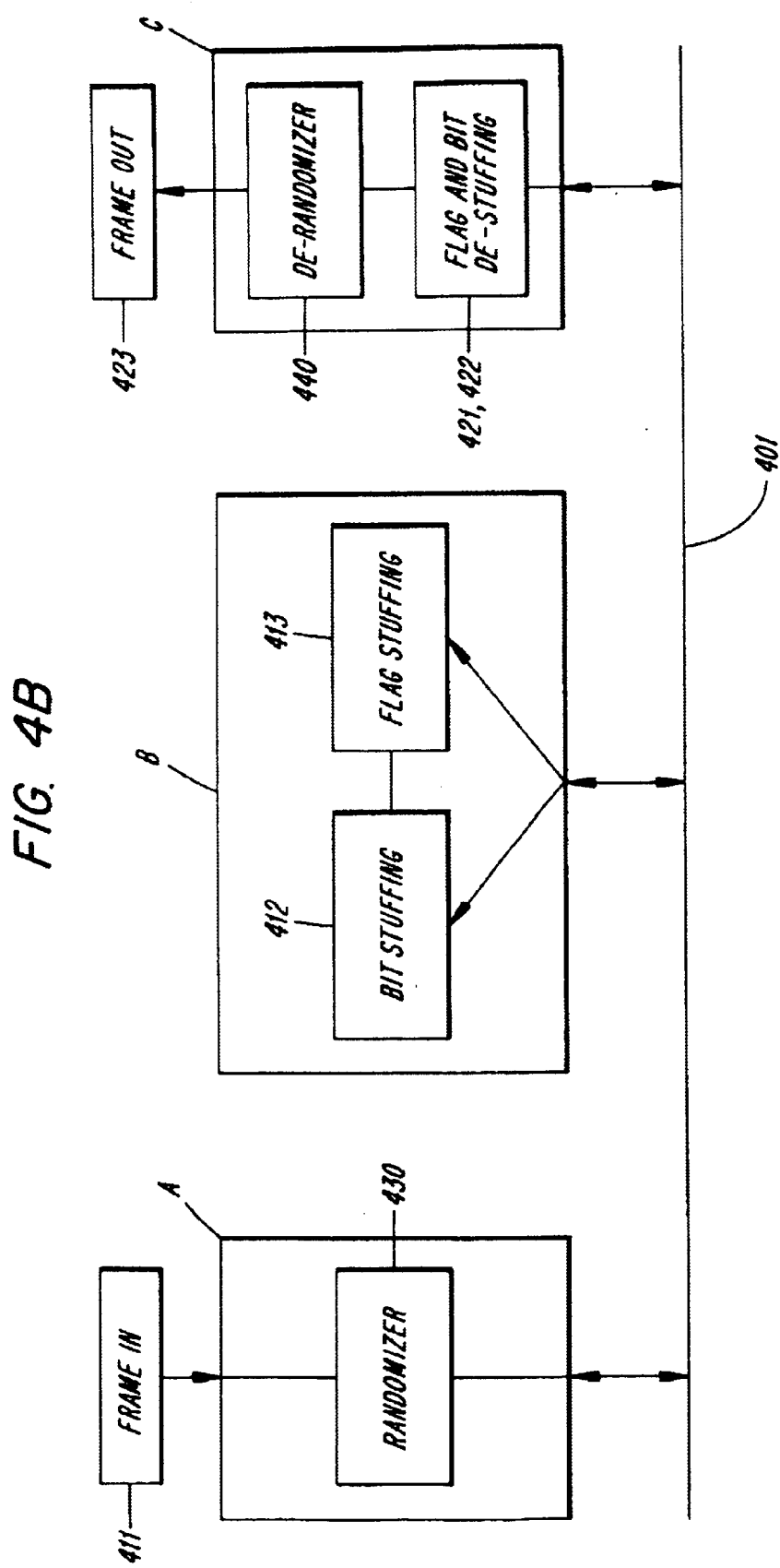
FIG. 4B is a diagram illustrating an exemplary rate adaptation environment in accordance with exemplary embodiments of the present invention.

It is important to note that randomizing and associated de-randomizing may be performed on different nodes from operations such as, for example, bit stuffing and de-stuffing. For instance, as illustrated in FIG. 4B, using an exemplary rate adaptation environment similar to that illustrated in FIG. 3 as an example, randomizer 430 in accordance with the present invention could be used in Node A, whereas the corresponding bit stuffing 412 and flag stuffing 413 could be performed at Node B. Moreover, flag de-stuffing 421 and bit destuffing 422 and de-randomizer 440 may, for example, all be used in Node C.

It will be appreciated by those skilled in the art that flag stuffing, with its companion bit stuffing, is a very simple data rate adaptation scheme widely implemented in the art and often implemented in hardware. Randomizer 430 is also preferably simple to implement. By randomizing the contents of frames at sender 410 and de-randomizing frame contents at receiver 420, data transparency overhead can be reduced sufficiently to compete with known rate adaptation schemes as may be better appreciated using the following analysis.

Data transparency overhead associated with flag stuffing cannot be accurately calculated without making certain assumptions. Thus, assuming that frame contents are random, that is, the value of each bit is independent of the value of all other bits, and has an equal probability for 0 and 1, and given a frame of length N, let $b(x)$, denote the $x^{th}$ bit and $E(x)$ be the event "a zero must be stuffed after $b(x)$." Furthermore, let $E_1(x)$ denote the event: "$b(x)$ is the first bit such that $E(x)$ is satisfied." Let $f(x)=P(E_1(x))$ represent the probability of $E_1(x)$. It should be noted that the events $E_1(x)$ and $E_1(y)$ are disjoint for $x \neq y$, implying that:

$$P(E_1(x) \vee E_1(y)) = f(x) + f(y) \tag{1}$$ and $$P(\exists i \leq x : E_1(i)) = \sum_{i=1}^{x} f(i) \tag{2}$$

It should be noted that for $x=1, \ldots, 4$, $E_1(x)$ is impossible, and $E_1(5)$ is equivalent to:

$$b(1)=1 \wedge b(2)=1 \wedge b(3)=1 \wedge b(4)=1 \wedge b(5)=1$$

$E_1(6)$ is equivalent to:

$$b(1)=0 \wedge b(2)=1 \wedge b(3)=1 \wedge b(4)=1 \wedge b(5)=1 \wedge b(6)=1 \tag{4}$$

For $x > 6$, $E_1(x)$ is equivalent to:

$$b(1)=1 \wedge b(x-1)=1 \wedge b(x-2)=1 \wedge b(x-3)=1 \wedge b(x-4)=1 \wedge b(x-5)=0$$
$$\wedge \neg \exists i \leq x-6 : E_1(i) \tag{5}$$

We thereby get the following recursive definition of $f$:

$$f(x)=0, \text{ for } x=1, \ldots, 4 \tag{6}$$

$$f(x)=1/32, \text{ for } x=5 \tag{7}$$

$$f(x)=1/64, \text{ for } x=6 \tag{8}$$

$$f(x) = \frac{1}{64}\left(1 - \sum_{i=1}^{x-6} f(i)\right) = f(x-1) - \frac{f(x-6)}{64}, \text{ for } x > 6. \tag{9}$$

If we further define $E(n,x)$, such that $n,x \geq 0$, denote the event:

"There are exactly n bits $b(x_1), \ldots, b(x_n)$ such that $x_1, \ldots, x_n \leq x$ for which $E(x_1), \ldots E(x_n)$,"

and define E(i, n, x), such that n,x≧0 and i≧1, denote the event:

"$E_1(i)$ and there are exactly n bits $b(x_1), \ldots, b(x_n)$ such that $i<x_1, \ldots, x_n \leq x$ for which $E(x_1), \ldots, E(x_n)$."

Let h(n,x)=P(E(n,x)), i.e., the probability of E(n,x). Thus it should be noted that E(0,0) will always be true. Furthermore, E(0,x) is equivalent to $\neg\exists i \leq x:E_1(i)$ and E(n+1,x) is equivalent to $\exists i \leq x:E(i,n,x)$. The probability of E(i,n,x) may be given by $P(E(i,n,x))=P(E_1(i))P(E(n,x-i))$. Thus, a recursive definition of h(n,x) may be given by:

$$h(0,0)=1 \quad (10)$$

$$h(0,x)=h(0,x-1)-f(x), \text{ for } x \leq 1 \quad (11)$$

$$h(n+1, x) = \sum_{i=1}^{x} f(i)h(n, x-i) \quad (12)$$

wherein h(n,N) may provide the exact distribution of stuffing bits, i.e., the distribution of the data transparency overhead, for a frame of length N. It should be noted that h(n,N) may be approximated by a Poisson distribution, however, the result of the Poisson distribution is not exact because the events $E(x_1), \ldots, E(x_n)$ are not independent of each other as assumed by the Poisson model.

As can be seen in FIG. 5, h(n,N) and the distributions provided by equations 10–12 may be used to predict the number of stuffing bits n that will be needed in a channel with a capacity expressed in terms of frames of size N in bits, per time interval as in the example provided below. Thus at start 501 of an exemplary frame transfer 500, randomizer block 510 may combine random sequence 511, preferably using exclusive OR (XOR) operation 512, with frame contents 513 to generate randomized frame 521. Randomized frame 521 may then be subjected to bit stuffing in accordance with bit stuffing protocols resulting in distributions predicted using, for example, h(n,N) 522. Such predictions should be in accord with equations 10–12 as previously noted. Bit stuffed data may then be transferred across link 530 having a link budget 531 expressed in terms of stuffing bits per frame. Bit stuffed frame 541 may then be input to bit de-stuffing block 540 and subjected to bit de-stuffing further in accordance with inverse stuffing operation 542 which is shown for illustrative purposes as $h(n,N)^-$ though this is not necessarily mathematically accurate. De-stuffed frame 551 may be combined or, preferably, uncombined in de-randomizer 540 with random sequence 552, preferably using, again, XOR operation 553 to generate original frame contents such as, for example, frame contents 513. It should be noted that random sequences 552 and 511 may be identical sequences which are known ahead of time at randomizer 510 and de-randomizer 540. Random sequences may be fixed for the duration of the session, connection, or longer, and may further be changed as often as per frame provided that randomizer 510 and de-randomizer 540 remain synchronized, that is, know what random sequence should be used for which frame. It should further be noted that by changing the random sequence more often, processing overhead related to synchronization of random sequences between randomizer 510 and de-randomizer 540 will be increased. Lastly, it should be noted that while random sequences 552 and 511 are combined with user data to form randomized frames and decode or uncombine randomized frames to recover original user data, using, for example, an XOR operation, alternate methods for randomization which are known in the art may also be used to accomplish randomization of user data to form randomized frames provided that randomizer 510 and de-randomizer 540 maintain proper synchronization.

Figure 6:
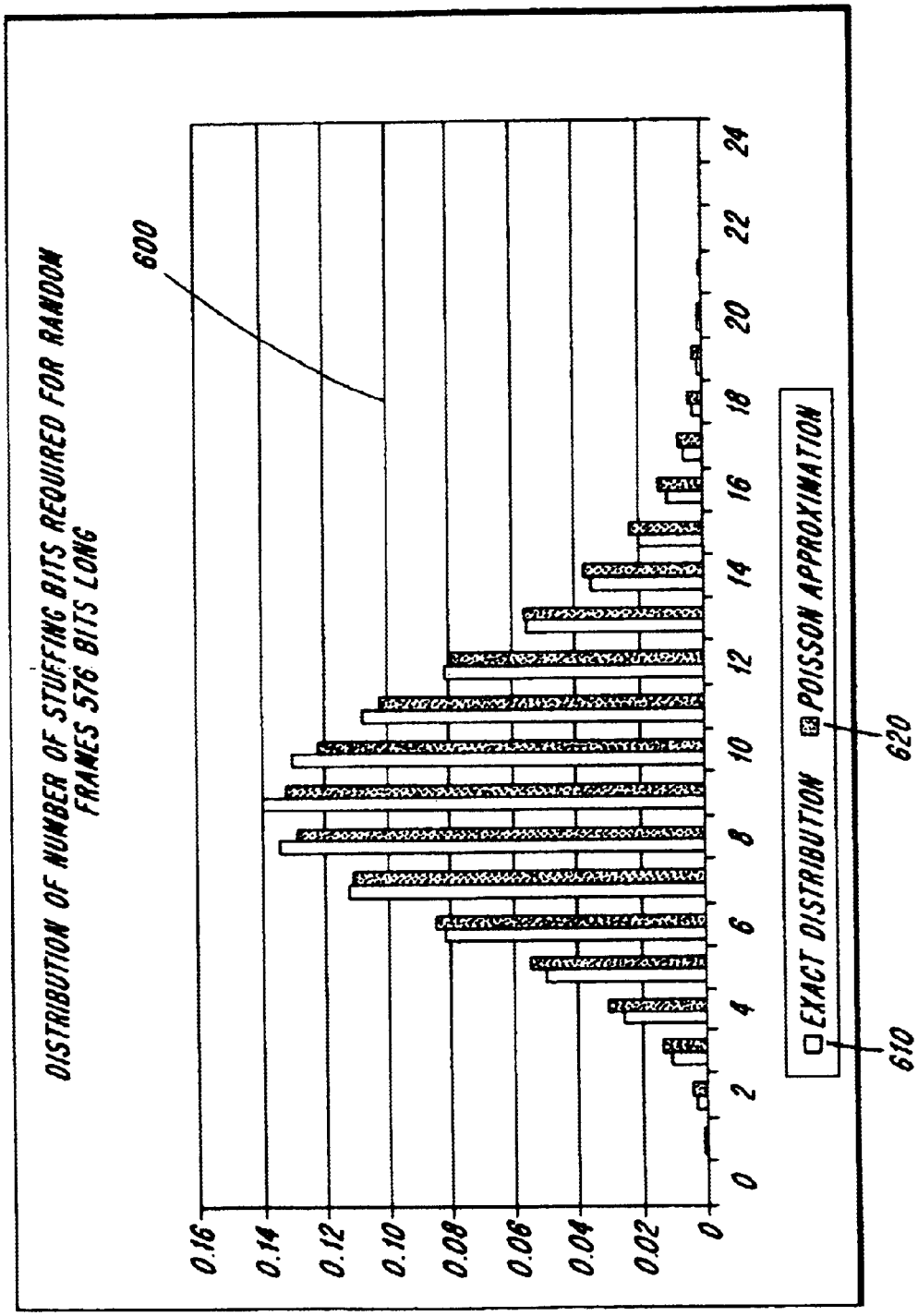
FIG. 6 is a graph illustrating an exemplary distribution of number of stuffing bits required in accordance with exemplary embodiments of the present invention.

FIG. 6 illustrates bar graph 600 showing a comparison between actual distribution 610 and Poisson distribution approximation 620 of the data transparency overhead for frames that are 576 bits long. As an example, assume, as in a previous example described herein above, that the required data rate is 57.6 kbit/s and that the data are structured into frames 576 bits long and transmitted every 10 ms. Further assume that data bits in the frames are randomly distributed and that for every frame at least one flag of eight bits is present in addition to the data bits to ensure data transparency. If a 64 kbit/s link is to be used, the budget for data transparency overhead is 640−576−8 bits/frame=56 bits/frame.

Figure 7A:
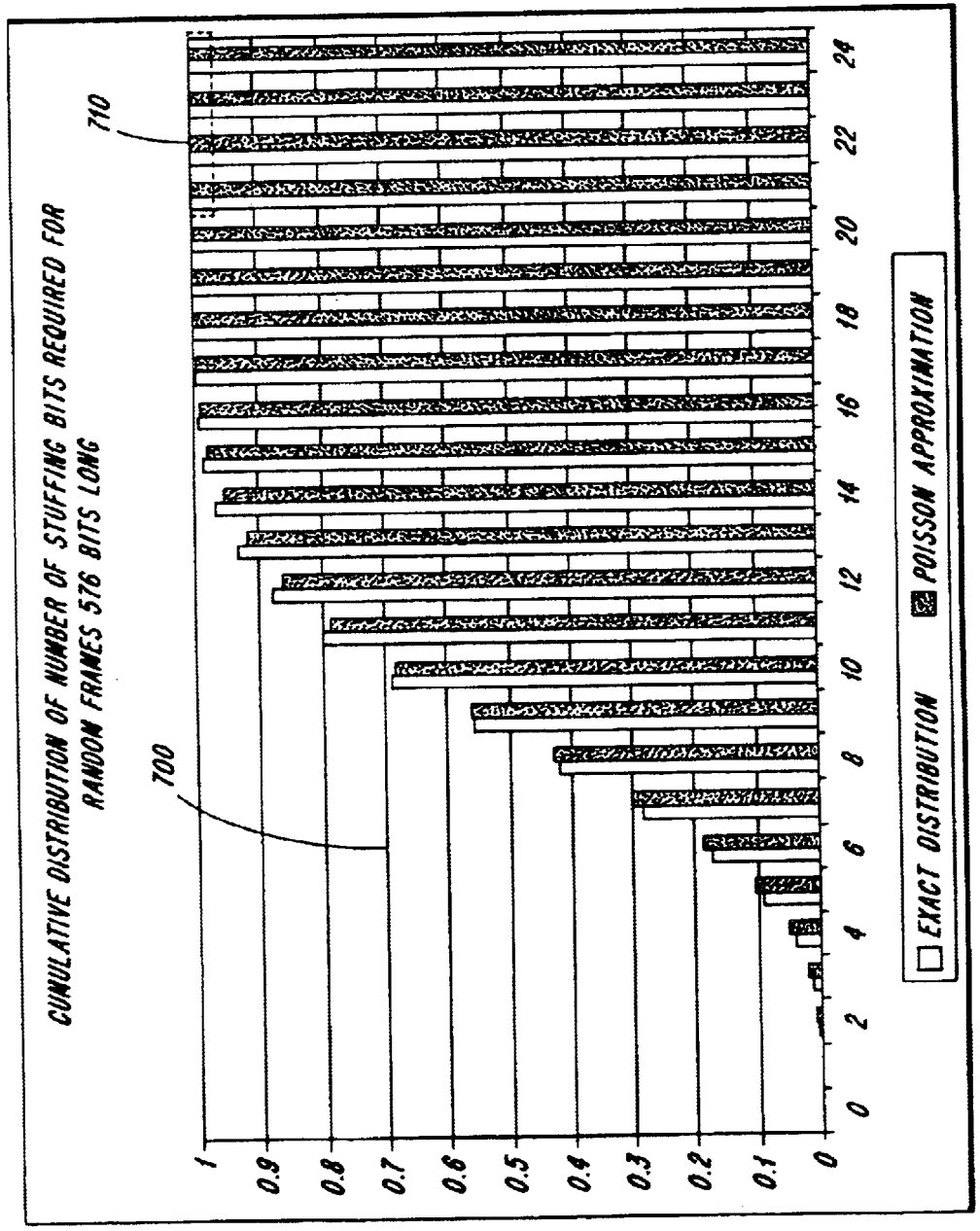
FIG. 7A is graph illustrating an exemplary cumulative distribution of number of stuffing bits required in accordance with exemplary embodiments of the present invention.
Figure 7B:
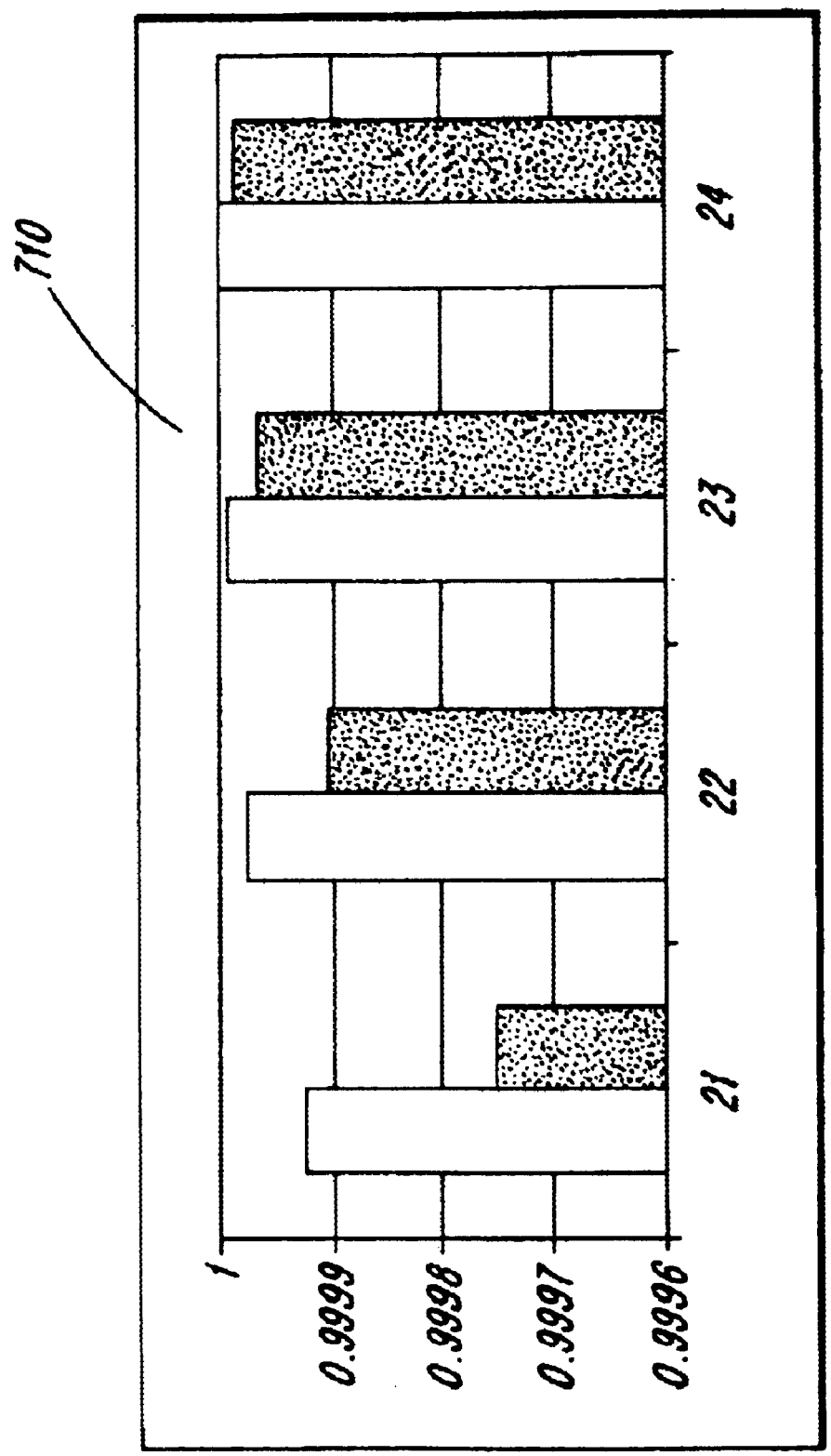
FIG. 7B is graph further illustrating the exemplary cumulative distribution of FIG. 7A.

In FIG. 7A, cumulative distribution bar graph 700 is illustrated wherein the length of each column, say, column n, may represent the sum of the lengths of corresponding columns 0 to n in FIG. 6 for successive random frames. Accordingly, it can be seen that the probability of having close to 24 stuffing bits, lets say from 20 to 24, as in area 710 is very close to 1 and, the probability of exceeding 24 stuffing bits is extremely low. FIG. 7B, further illustrates area 710 showing, for example, the last four bars in bar graph 700 of FIG. 7A, as can be seen, the probability of exceeding 24 stuffing bits is in the order $10^{-5}$. Thus, unlike the example described herein above with reference to FIG. 3, in the prior art where bandwidth budgets risk being exceeded for the probability of exceeding the budget of 56 bits is negligible for all practical purposes.

The invention has been described herein with reference to particular embodiments. However, it will be readily apparent to those skilled in the art that it may be possible to embody the invention in specific forms other than those described above. This may be done without departing from the spirit of the invention. Embodiments described above are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for providing rate adaptation between a first node and a second node in a data communication environment employing bit stuffing, the data communication environment having a link budget of B bits per second the method comprising the steps of:

randomizing one or more N-sized frames of user data at the first node according to a predetermined random sequence to produce one or more randomized N-sized frames of user data, comprising the step of combining the one or more N-sized frames of user data with one or more random sequences;

detecting one or more occurrences of a flag sequence related event in the one or more N-sized frames of user data after the step of randomizing;

inserting up to n bits in the one or more N-sized frames of user data according to a bit stuffing protocol for each of the one or more occurrences detected such that by performing the step of randomizing before the step of inserting n and N are selected such that n+N does not exceed B, wherein the step of inserting up to n bits further includes determining a distribution of stuffing bits n according to a probability distribution function h(n,N), the distribution associated with the one or more randomized N-sized frames such that n and N are selected so that n+N does not exceed B; and de-randomizing the one or more randomized N-sized frames of user data at the second node according to the predetermined random sequence, comprising the step of uncombining the one or more N-sized frames of user data with the one or more random sequences;

wherein N is the size of the one or more N-sized frames in bits.

2. The method of claim 1, further comprising the step of removing the up to n bits such that the step of de-randomizing can be performed.

3. A system for providing rate adaptation in a data communication environment employing bit stuffing, the system comprising:

a first node;

at least a second node; and a link connecting at least the first node and the at least a second node for providing data communication therebetween in the data communication environment, the link having a link budget of B bits per second, the system configured to;

randomize one or more N-sized frames of user data at the first node according to a predetermined random sequence to produce one or more randomized N-sized frames of user data, wherein the one or more N-sized frames of user data are combined with one or more random sequences;

detect one or more occurrences of a flag sequence related event in the one or more N-sized frames of user data after the step of randomizing;

insert up to n bits in the one or more N-sized frames of user its according to a bit stuffing protocol for each of the one or more occurrences detected such that by randomizing, n and N may be selected such that n+N does not exceed B, wherein the system, in inserting up to n bits, is further configured to determine a distribution of stuffing bits n according to a probability distribution function h(n,N), the distribution associated with the one or more N-sized frames such that n and N are selected so that n+N does not exceed B; and de-randomizing the one or more randomized N-sized frames of user data at the at least a second node according to the predetermined random sequence, wherein the one or more N-sized frames of user data are uncombined with the one or more random sequences;

wherein N is the size of the one or more N-sized frames in bits.

4. The system of claim 3, further comprising the step of removing the up to n bits such that the step of de-randomizing can be performed.

* * * * *

UNITED STATES PATENT AND TRADEMARK OFFICE
CERTIFICATE OF CORRECTION

| | |
|---|---|
| PATENT NO. | : 6,859,465 B1 |
| APPLICATION NO. | : 09/665057 |
| DATED | : February 22, 2005 |
| INVENTOR(S) | : Erik A. Colban |

It is certified that error appears in the above-identified patent and that said Letters Patent is hereby corrected as shown below:

In Column 6, Line 50, in Equation 5, delete "b(1)" and insert -- b(x) --, therefor.

In Column 6, Line 54, delete "off:" and insert -- of $f$: --, therefor.

In Column 7, Line 44, delete "h(n,N)⁻" and insert -- $h(n,N)^{-1}$ --, therefor.

In Column 10, Line 6, in Claim 3, delete "its" and insert -- data --, therefor.

Signed and Sealed this

Thirtieth Day of October, 2007

JON W. DUDAS
*Director of the United States Patent and Trademark Office*